United States Patent [19]

Kang et al.

[11] Patent Number: 5,503,717
[45] Date of Patent: Apr. 2, 1996

[54] METHOD OF MANUFACTURING FLEXIBLE GRAPHITE

[76] Inventors: Feiyu Kang, Room 312 Building 2, Northwest District, Tsinghua University, Beijing, 100084, PRC, China; Yang Leng, 15H, Block 15, Sceneway Garden, Lam Tin; Tong-Yi Zhang, 1/F DD227, Lot 855, Pik Shui Sun Tsuen, Clear Water Bay, both of Kowloon, Hong Kong; Yiu-Wing Mai, 20 Charles Street, Killara, NSW 2071, Australia

[21] Appl. No.: 259,001

[22] Filed: Jun. 13, 1994

[51] Int. Cl.⁶ .................. C25B 1/26; C25B 1/00
[52] U.S. Cl. ........................... 205/478; 204/294
[58] Field of Search ................ 204/294, 59 R, 204/128, 130, 293, 86, 94

[56] References Cited

U.S. PATENT DOCUMENTS

| | | | |
|---|---|---|---|
| 4,244,934 | 1/1981 | Kondo et al. | 423/448 |
| 4,994,221 | 2/1991 | Tanaka et al. | 204/130 X |
| 5,130,211 | 7/1992 | Wilkinson et al. | 205/59 X |
| 5,149,414 | 9/1992 | Chiang et al. | 204/294 |
| 5,330,680 | 7/1994 | Sakawaki et al. | 204/157.42 X |
| 5,346,650 | 9/1994 | Toda et al. | 423/448 X |

*Primary Examiner*—Donald R. Valentine
*Attorney, Agent, or Firm*—Burns, Doane, Swecker & Mathis

[57] ABSTRACT

A $ZnCl_2$-graphite intercalation compound is synthesised by an electrochemical process in an aqueous solution. Flexible graphite is manufactured by exfoliating and then compressing the $ZnCl_2$-graphite intercalation compound into a sheet form. This processing is suitable for mass production. As no sulphuric acid is used in this method, the method reduces environmental pollution and corrosion during use.

8 Claims, 1 Drawing Sheet

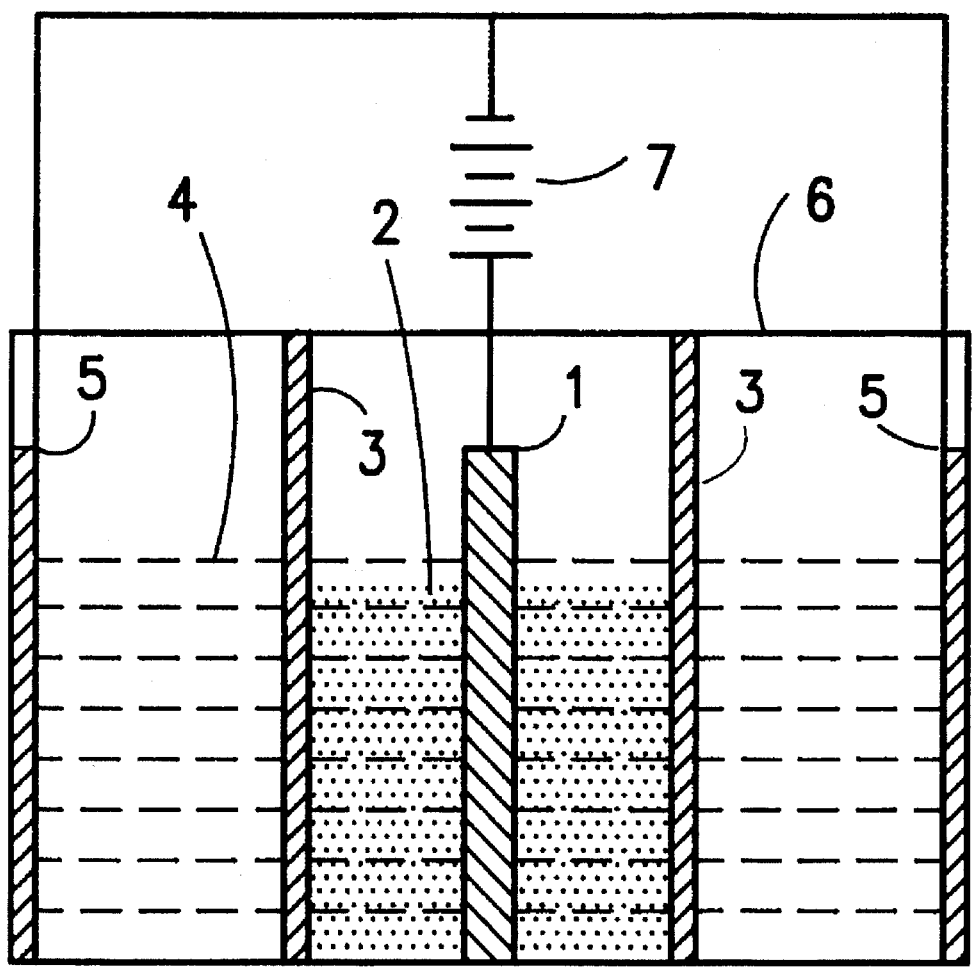

METHOD OF MANUFACTURING FLEXIBLE GRAPHITE

FIELD OF THE INVENTION

This invention relates to the manufacture of graphite materials, and in particular to the exfoliation and formation of flexible graphite.

BACKGROUND OF THE INVENTION

Flexible graphite has found many uses and applications, for example it is an excellant sealing material and may be used for gaskets and packing material at elevated temperatures.

The crystal structure of natural flake graphite consists of layered planes of hexagonally arranged carbon atoms with strong covalent bonding within the basal planes and weak van der Waals bonding between the layers. Due to such characteristics, many species of molecules, atoms, ions and even atomic clusters can be inserted betwen the carbon planes. Such intercalation creates a new type of compound known as a graphite intercalation compound (GIC). Properties of GICs differ not only from those of the host graphite, but also from the properties of the guest intercalates.

When a GIC is rapidly heated to a high temperature, the intercalates between the graphite layers vaporise and the GIC decomposes. This results in an over eighty-fold expansion in volume compared to the original flake material. This expansion (exfoliation) produces worm-like or vermiform structures with highly active, dendritic, rough surfaces which can be either molded or calendered into sheets.

The expansion process removes substantially all extraneous chemicals from the flake. The molding or calendering causes only mechanical interlocking of the expanded flakes so that the composition of the final sheet product is effectively pure graphite. Flexible graphite is a distinctive material with the essential characteristics of graphite plus some unique properties of its own. The standard properties of graphite include thermal stability, thermal conductivity, natural lubricity and chemical resistance to fluids. Flexible graphite combines with these properties the additional properties of flexibility, conformability and resilience. Such characteristics of flexible graphite differ from other forms of graphite and make flexible graphite a superior high-performance sealing material.

For example, gaskets made by flexible graphite are superior to conventional elastomeric bonded gaskets, such as compressed asbestos. The flexible graphite is more thermally stable and chemically inert with considerably less creep relaxation. More importantly, flexible graphite is not harmful to health, while asbestos can induce cancer. Gaskets fabricated from flexible graphite are also preferable to other non-asbestos sheet gaskets, such as aramids, glassfibre, and mica which have to be stock together by an elastomer. The elastomer typically reduces gasket thermal stability and increases creep, thus resulting in poor performance under loading.

PRIOR ART

The traditional process for manufacturing flexible graphite is described as follows. Firstly, sulphuric acid is intercalated into natural graphite; then the $H_2SO_4$-GIC is expanded at a temperature range of 800°–1000° C.; finally the exfoliation product is compressed into a flexible sheet.

This process has at least two major disadvantages. The intercalation and expansion process can cause environmental pollution as it releases large amounts of $SO_2$ and $SO_3$. In addition residual $SO_2$ and $SO_3$ in the expanded graphite can corrode metals contacting the graphite seals. These disadvantages greatly limit the potential application of flexible graphite in, for example, nuclear power plants and automotive parts. Modern industries require environmentally friendly and low-corrosive flexible graphite.

Other techniques for manufacturing GICs using different intercalates are also known. As examples one can cite Stummp, E., Ehrhardt, C. and Klink, K., "*Electrochemical Preparation of Zinc Chloride and Mercury Nitrate Graphite Intercalation Compounds*", *Ext. Abstr. Program Bienn. Conf. Carbon,* 16th, pp 254–5, 1983,: Stumpp, E. and Werner, F., "*Graphite Intercalation Compounds with Chlorides of Manganese, Nickel and Zinc*", *Carbon* 4(4), 1966,: and Behrens, P., Beuthien, H., Eickhoff, H. P., Metz, W and Niemann, W., "*Structural Investigations of the Graphite Intercalation Compounds of the Dichlorides of the IIB-Elements (Zinc, Cadmium and Mercury)*", *Synth. Met.* 23 (1–4), 95–100, 1988. These disclosures teach the formation of a $ZnCl_2$-GIC using a $ZnCl_2$ melt, but they do not teach a satisfactory method for the manufacture of flexible graphite.

SUMMARY OF THE INVENTION

According to the present invention there is provided a method for forming flexible graphite comprising the steps of:

(a) forming a $ZnCl_2$-graphite intercalation compound by an electrochemical process wherein aqueous $ZnCl_2$ solution serves as the intercalate source, (b) expanding the $ZnCl_2$ interclated graphite by rapid heating to a high temperature, and (c) mechanically processing the expanded graphite into a desired form.

This method has significant advantages over the prior art. For example it produces no sulphuric pollution since no sulphuric acid is used in the intercalation process. The technique requires less expensive equipment since the manufacturing facilities do not have to be highly corrosion resistant. The process may be conducted in air and at ambient temperature. The technique is suitable for industrial application. By means of electrochemical processing in aqueous solution it is easy to control GIC qualities by adjusting electrical parameters and the solution concentration. It may also be possible to adapt the technique to the production of other intercalation compounds, for example ferrochloride-GIC.

Preferably the $ZnCl_2$ is intercalated into graphite in the form of natural graphite flakes which serve as the anode. A stainless steel plate serves as the cathode and the $ZnCl_2$ solution serves as the electrolyte and as the intercalate source. Polymer nets may be used to seperate the anode and the cathode. A synthesised graphite bar may also be used as a supplementary anode.

The invention also extends to flexible graphite sheets manufactured by the above method, and also extends to the intermediary products, in particular to a $ZnCl_2$-GIC when produced by the method of step (a) above, and to an expanded graphite produced by the method of steps (a) and (b) above.

BRIEF DESCRIPTION OF THE DRAWING

An embodiment of the invention will now be described by way of example and with reference to the accompanying FIGURE which illustrates the apparatus for GIC synthesis in aqueous solution.

DETAILED DESCRIPTION OF PREFERRED EMBODIMENT

In this method natural graphite flakes are electrochemically intercalated with zinc chloride in aqueous solution and the intercalated graphite flakes exfoliated thermally, then mechanically moulded into flexible graphite sheets or into bulk form.

Natural graphite flakes 2 and a synthesized graphite bar 1 are used as the host anode and supplementary anode respectively. Stainless steel plates 5 are used as the cathode. Polymer nets 3 prevent graphite flakes from contacting the cathode but provides good pass for the electrolyte 4. The electrolyte comprises aqueous $ZnCl_2$ solution which also serves as the source of the intercalate. Acid addition is not necessary in the electrolyte. Both steady and pulsed direct current can be used in the electrochemical reaction. The efficiency of intercalation processing and stage structure of the $ZnCl_2$ are controlled by the solution concentration, the current density and temperature. The apparatus is housed in a reactor 6 and provided with a power supply 7.

After the electrochemical reactions, the flakes of graphite intercalated with zinc chloride are rinsed with water and dried at 80° C. for two hours. They have a volatile content of 8–15% and a moisture content of 1–2%. The intercalated graphite flakes are easily exfoliated when rapidly heated. During exfoliation chlorine is vaporised and the volume of the flakes expands rapidly when the temperature exceeds 400° C. The expansion volume is over 100 cc/g depending on the expansion temperature, the higher the temperature the larger the volume. The expanded graphite has a worm-like structure with highly active, dendritic and rough surfaces. It can be either molded or calendered into sheets of flexible graphite by mechanical pressing without any adhesion.

The flexible graphite manufactured by this method contains very little residual chlorine (less than 50 ppm) and no sulphur from the processing (other than trace amounts from the raw graphite flakes). This is in comparison with flexible graphite manufactured using conventional techniques which typically contains about 1000 ppm sulphur. A few zinc and fine zinc oxide particles remain in the host graphite layers. These may be beneficial since the zinc will protect iron against corrosion and the oxide particles will strengthen the host material. Thus the flexible graphite manufactured by this method is less corrosive and mechanically stronger than conventionally produced flexible graphite.

Examples

Natural flake graphite (average particle size 0.3 mm, carbon content 99 wt %) was used as the anode, an aqueous solution of $ZnCl_2$ with an 8–12 molar concentration was used as the electrolyte. An intercalation reaction occurred under an applied anodic current density of 2000–5000 A/m². The intercalation was accompanied by anodic oxidation. The typical reaction time was 2–4 hours after which the graphite flakes were collected, rinsed in water to remove unreacted $ZnCl_2$ and then dried at 80° C. for 2 to 4 hours. The flakes of $ZnCl_2$-GIC were then ready for exfoliation. The intercalated graphite flakes were examined by powder X-ray diffractometry and the stage structure of the flakes was determined by examining the diffraction patterns of (001) crystallography planes of the graphite. Generally stages 1 to 5 were obtained from the above processing.

A graduated quartz glass beaker was heated to a specified temperature in a Muffle furnace, 1 gm of $ZnCl_2$-GIC was rapidly poured into the beaker, the sample decomposed and expanded. After 7–10 seconds the beaker was taken out and the expansion volume was measured. Table 1 shows the relationship between the expansion volume and the expansion temperature for both $ZnCl_2$-GIC manufactured by the above method and conventional $H_2SO_4$-GIC. It will be noted that at low expansion temperatures the expansion volume of $ZnCl_2$-GIC is less than that of $H_2SO_4$-GIC, but at temperatures above 700° C. this is reversed.

TABLE 1

Comparison of expansion volume of zinc chloride- and sulphuric acid-GICs

| Expansion temperature (°C.) | Expansion volume $ZnCl_2GIC$ (cc/g) | Expansion volume $H_2SO_4GIC$ (cc/g) |
|---|---|---|
| 400 | 55 | 135 |
| 500 | 110 | 150 |
| 600 | 140 | 160 |
| 700 | 170 | 165 |
| 800 | 200 | 185 |
| 900 | 230 | 190 |
| 1000 | 255 | 195 |
| 1100 | 250 | 190 |
| 1200 | 245 | 185 |

Scanning electron microscopy (SEM) was used to examine the morphology of the exfoliated graphite. Worm-like or vermiform structures with highly active, dendritic and rough surfaces were revealed.

During expansion most of the chlorine was released, therefore the amount of residual chlorine was very small. But a few zinc and fine zinc oxide particles remained in the host graphite after expansion. Table 2 shows the residual element content in the expanded graphite synthesised by the electrochemical method. These figures should be contrasted with residual sulphur amounts of 1200 ppm at an expansion temperature of 1000° C. and 900 ppm at 1200° C. for graphite produced by conventional methods.

TABLE 2

The content of residual element in the expanded graphite

| Expansion temperature (°C.) | 1000 | 1200 |
|---|---|---|
| Residual chlorine (ppm) | 50 | 20 |
| Zinc oxide & zinc | 0.8 | 0.9 |

Flexible graphite sheets were made by mechanical pressing and were tested in a universal testing machine. The important properties determined in the tests include tensile strength, compression strength, compression ratio, recovery ratio and creep relaxation. Table 3 shows the mechanical properties of calendered foils made from $ZnCl_2$-GIC and $H_2SO_4$-GIC. Both GICs were expanded at 1050° C. and their expansion volumes were 270 and 200 cc/g respectively. For each GIC two sheets were prepared, one of a thickness of 0.254 mm and the other of a thickness of 0.38 mm. It will be noted that the tensile and compression strengths of foils made from $ZnCl_2$-GIC were some 10–20% higher than for foils made from $H_2SO_4$-GIC. Other properties were similar.

TABLE 3

Comparison of flexible foils from zinc-chloride-GIC and sulphuric acid-GIC

| Intercalates | Zinc chloride | | Sulphuric acid | |
|---|---|---|---|---|
| Thickness (mm) | 0.254 | 0.38 | 0.254 | 0.38 |
| Density (g/cc) | 1.0 | 1.0 | 1.0 | 1.0 |
| Tensile strength (MPa) | 4.5 | 5.1 | 3.9 | 4.2 |
| Compressing strength (MPa) | 90.0 | 95.1 | 80.2 | 81.1 |
| Compressibility (%) | 53.5 | 53.1 | 54.0 | 53.6 |
| Recovery (%) | 27.3 | 28.0 | 27.5 | 28.2 |
| Creep relaxation (%) | 3.9 | 3.8 | 3.8 | 3.7 |

Compressibility, recovery and creep relaxation are three important parameters for gasket materials. Compressibility and recovery indicate the short-time capability of compression and recovery of materials. Creep relaxation indicates resistance of compressive stress relaxation in a given time period at ambient temperature. These parameters were measured using the methods defined in ASTM standards F36 and F38. According to standard F36 compressibility and recovery are defined as:

$$Compressibility\ \% = [(P-M)/P] \times 100$$

$$Recovery\ \% = [(R-M)/(P-M)] \times 100$$

Where P is the thickness under preload, M is the thickness under total load, and R is the recovered thickness. According to standard F38 creep relaxation is defined as:

$$Relaxation\ \% = [(D_o - D_f)/D_o] \times 100$$

Where $D_o$ and $D_f$ are the initial and final compressive stress respectively. The duration of the tests was 24 hours.

We claim:

1. A method of forming a sheet of flexible graphite comprising the steps of:
   (a) forming a $ZnCl_2$-graphite intercalation compound by an electrochemical process wherein aqueous $ZnCl_2$ solution serves as the intercalate source,
   (b) expanding the $ZnCl_2$ intercalated graphite produced in step (a) by rapid heating to a high temperature to release substantially all the zinc and chlorine and produce an expanded graphite product, and
   (c) mechanically processing the expanded graphite produced in step (b) into a sheet of flexible graphite.

2. A method as claimed in claim 1 wherein natural graphite flakes serves as an anode in the electrochemical process, and wherein a stainless steel plate serves as the cathode.

3. A method as claimed in claim 2 wherein a supplementary anode is provided in the form of a graphite bar.

4. A method as claimed in claim 1 wherein the aqueous $ZnCl_2$ solution is at an 8–12 molar concentration, and a current density of 2000–5000 A/m$^2$ is applied.

5. A $ZnCl_2$-graphite intercalation compound when manufactured by the method of step (a) of claim 1.

6. A method for forming a $ZnCl_2$-graphite intercalation compound by an electrochemical process which comprises reacting graphite flakes and zinc chloride in an aqueous solution under conditions which provide for the formation of a $ZnCl_2$-graphite intercalation compound.

7. The method of claim 6, wherein the concentration of $ZnCl_2$ in the solution ranges from 8 to 12 molar.

8. The method of claim 6, wherein the reaction is effected using an applied anodic current density ranging from 2,000 to 5,000 A/m$^2$.

* * * * *